Patented Mar. 19, 1940

2,193,997

UNITED STATES PATENT OFFICE 2,193,997

ICE COLOR

Frithjof Zwilgmeyer, Arden, Del., assignor to E I. du Pont de Nemours & Company, Wilmington, Del., a corporation of Delaware No Drawing. Application July 2, 1937,
Serial No. 151,670

14 Claims. (Cl. 260—188)

This invention relates to azo dyes which can be used to give brown shades on cotton, regenerated cellulose and similar materials, and especially to compounds in which an ice color coupling component, such as an aryl-amide of ortho-hydroxy-carboxylic and an aryl-amide of beta-keto-carboxylic acid is coupled to a diazotized compound represented generally by the formula

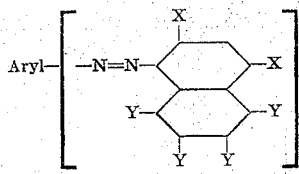

in which Aryl is an aromatic nucleus of a compound from the group consisting of benzene, naphthalene, carbazole, anthracene, diphenyl and azo-benzene compounds, one X is hydroxy and the other is hydrogen, one Y is amino and the other Y's are hydrogen, and $n$ is an integer 1 or 2, depending upon whether the Aryl-azo group is derived from an aryl amine or a diamine. In these compounds Aryl may be substituted by groups other than solubilizing groups, that is Aryl may be unsubstituted or it may be substituted generally by groups which do not lend solubility to the compounds.

It is an object of the invention to provide new azo combinations by means of which cotton, regenerated cellulose and similar materials can be dyed easily, in shades of brown which have good fastness to washing, light and the exposures to which fibres and textile materials are subjected. Another object of the invention is to provide fabrics dyed with the new compounds. Another object of the invention is to provide processes for making the new combinations and process for dyeing in shades of brown which have superior properties and are more convenient to operate than processes for obtaining such dyeings as practiced heretofore. Other objects of the invention will be apparent from the following description.

The objects of the invention are attained generally by diazotizing an amino-azo compound which is represented by the following formula

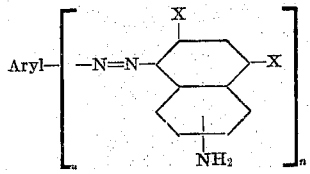

in which Aryl is the aryl radical of a compound from the group consisting of benzene, naphthalene, carbazole, anthracene, diphenyl and azo-benzene compounds, which may be substituted by any n-auxochrome but not by sulfonic acid or carboxyl, one X is hydroxy and the other is hydrogen, $n$ is an integer 1 or 2, and —NH₂ is substituted in any one of the positions of the benzene ring of the naphthalene nucleus which is not substituted by the azo group. This diazotized compound is then coupled to a diazo dye coupling component which is free from solubilizing groups, such as one from the group consisting of the aryl-amides of ortho-hydroxy-aryl-carboxylic acid and the aryl amides of beta-keto-carboxylic acid. In the dyeing of fabrics the fabric may desirably be impregnated with the coupling component and then developed in a solution of a diazotized compound represented by the formula hereinbefore described. The azo-arylamines represented by the formula may be separated from the diazo reaction mixtures and converted to water soluble diazoimino compounds or to anti-diazotates by the methods well known in the art. In dyeing, these diazoimino compounds or anti-diazotates are mixed with the described coupling components, the material to be dyed is dyed with the mixture and the color is developed by treatment with weak acids. In printing, a suitable mixture containing the diazoimino or anti-diazotate and the coupling component is made, printed on the material to be dyed and then developed. The aryl-amides of the formula may also be converted to stabilized diazo salts and these may be used for dyeing and printing on fibres which were previously impregnated with the coupling components.

The invention will be more fully understood by reference to the following examples in which all quantities are expressed in parts by weight unless otherwise specified, but the invention is not limited to the examples.

Example 1

10 grams of cotton piece goods were impregnated by immersing in a bath heated to about 70° C. and containing 2 grams of 2-(2'-hydroxy-naphthalene-3'-carboyl-amino)-1-methoxy benzene, 2 cubic centimeters of alcohol and 2 cubic centimeters of 30% caustic soda solution. The goods were squeezed and submerged in a diazo solution containing 2 grams of diazotized 8-(2':4'-dimethyl benzene-azo)-1-amino-7-hydroxy-naphthalene which was slightly acid with acetic acid. The goods were then submerged in a 2% caustic soda solution, rinsed, soaped 2 minutes at a boil, again rinsed and dried.

The goods was dyed a brown shade which was fast to light, washing and the usual exposures to which such fabrics are exposed.

The dye is represented by the following formula

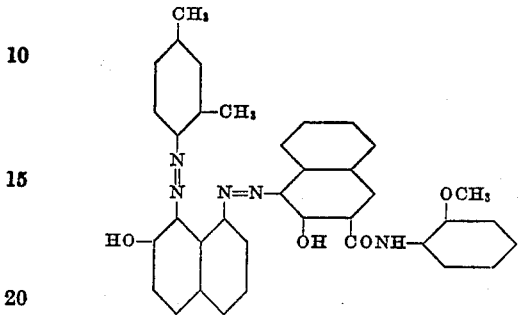

Example 2

The procedure of Example 1 was followed using a solution of diazotized 8-(2'-methoxy:5'-methyl-benzeneazo)-1-amino-7-hydroxy naphthalene instead of the diazo component used therein. A brown shade having similar properties to the dyeing of Example 1 was produced. The dye is represented by the formula

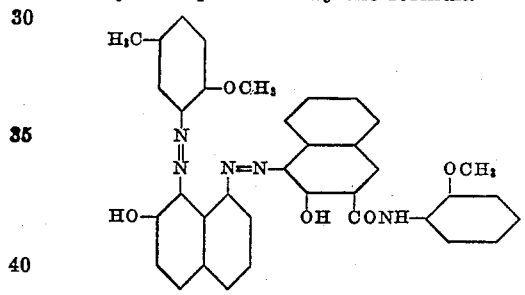

Example 3

The procedure of Example 1 was repeated using a solution of diazotized 8-(4'-methyl-benzeneazo)-1-amino-7-hydroxy naphthalene instead of the diazo compound used therein.

A brown shade having similar properties to the dyeing of Example 1 was produced. The dye is represented by the following formula

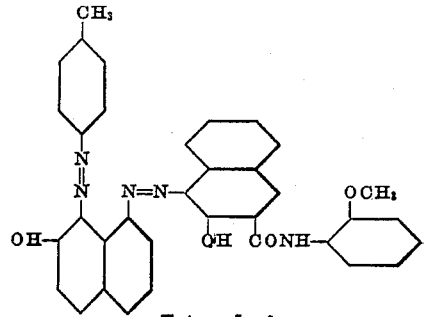

Example 4

10 grams of cotton piece goods were impregnated for 15 min. in a bath at about 70° C. containing 2 g. of 2-(2'-hydroxy-naphthalene-3'-carboyl-amino)-1-methyl-benzene, 2 cc. alcohol and 2 cc. 30% caustic soda. The cotton piece goods was squeezed and the dyeing was developed by submersion into one liter of a diazo solution containing 2 g. of diazotized 4-(2':5'-dichlor-benzene-azo)-1-amino - 7 - hydroxy-naphthalene, then into a second bath containing 1% caustic soda solution, rinsed, soaped 2 minutes at a boil, again rinsed and dried.

A deep, brown shade of good fastness was obtained. The dyestuff is represented by the following formula

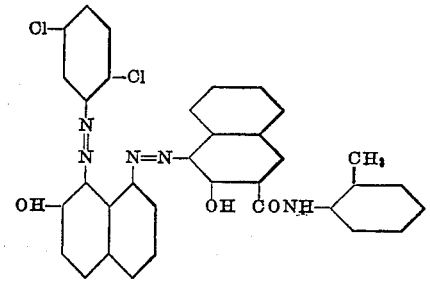

In an analogous manner, dyeings were produced from the following diazo and coupling components. These dyes had the improved properties of the dye described in Examples 1 to 4.

| | Diazo component | Coupling component | Color |
|---|---|---|---|
| 5 | 8-(2'-methyl-5'-chloro-benzene-azo)-1-amino-7-hydroxy-naphthalene. | 2-(2'-hydroxy-naphthalene-3'-carboyl-amino)-1-ethoxy-benzene. | Brown. |
| 6 | 8-(2'-methoxy-5'-chlor-benzene-azo)-1-amino-7-hydroxy-naphthalene. | 2-(2'-hydroxy-naphthalene-3'-carboyl-amino)-1-methyl-benzene. | Do. |
| 7 | ----do---- | 2-(2'-hydroxy-naphthalene-3'-carboyl-amino)-2-nitro-benzene. | Reddish brown. |
| 8 | ----do---- | 2-(2'-hydroxy-naphthalene-3'-carboyl-amino)-1:4-dimethoxy-benzene. | Brown. |
| 9 | ----do---- | Aceto-acetyl-para-phenetidine. | Yellowish brown. |
| 10 | 8-(2'-nitro-4'-chloro-benzene-azo)-1-amino-7-hydroxy-naphthalene. | 2-(2'-hydroxy-naphthalene-3'-carboyl-amino)-1-methyl-benzene. | Brown. |
| 11 | ----do---- | 2-(2'-hydroxy-naphthalene-3'-carboyl-amino)-1-ethoxy-benzene. | Do. |
| 12 | 8-(1'-anthraquinone-azo)-1-amino-7-hydroxy-naphthalene. | 2-(2'-hydroxy-naphthalene-3'-carboyl-amino)-1-methyl-benzene. | Dark brown. |
| 13 | ----do---- | 2-(2'-hydroxy-naphthalene-3'-carboyl-amino)-1-ethoxy-benzene. | Do. |
| 14 | 8-(2'-anthraquinone-azo)-1-amino-7-hydroxy-naphthalene. | 2-(2'-hydroxy-naphthalene-3'-carboyl-amino)-1-methyl-benzene. | Do. |
| 15 | ----do---- | 2-(2'-hydroxy-naphthalene-3'-carboyl-amino)-1-ethoxy-benzene. | Do. |
| 16 | 8-(1'-anthraquinone-azo)-1-amino-7-hydroxy-naphthalene. | Aceto-acetyl-para-phenetidine. | Brown. |
| 17 | 4:4'-di-(2'-hydroxy-8''-amino-naphthalene-1''-azo)-3:3'-dimethyl-diphenyl. | 2-(2'-hydroxy-naphthalene-3'-carboyl-amino)-1-methyl-benzene. | Dark brown. |
| 18 | ----do---- | Aceto-acetyl-para-phenetidine. | Brown. |
| 19 | 8-4'-(4''-dimethylamino-benzene-azo)-benzene-1'-azo-1-amino-7-hydroxy-naphthalene. | 2-(2'-hydroxy-naphthalene-3'-carboyl-amino)-1-methyl-benzene. | Do. |
| 20 | 4:4'-di-(8''-amino-2''-hydroxy-naphthalene-1''-azo)-3:3'-dimethly-diphenylene-sulfone. | ----do---- | Black. |
| 21 | 8-(3'-azo-carbazole)-1-amino-7-hydroxy-naphthalene. | ----do---- | Yellowish brown. |
| 22 | 8-(2'-methoxy-5'-chlor-benzene-azo)-1-amino-5-hydroxy-naphthalene. | ----do---- | Dark brown. |
| 23 | 8-(2':5'-dichlor-benzene-azo)-1-amino-5-hydroxy-naphthalene. | ----do---- | Do. |
| 24 | 8-(2':5'-dichlor-benzene-azo)-2-amino-7-hydroxy-naphthalene. | ----do---- | Brown. |

| | Diazo component | Coupling component | Color |
|---|---|---|---|
| 25 | 8-(2':5'-dimethoxy-benzene-azo)-1-amino-7-hydroxy-naphthalene. | 4-(3'-nitro-benzene-azo)-1-acetyl-amino-7-hydroxy-naphthalene. | Yellowish brown. |
| 26 | 8-(2'-methoxy-5'-methyl-benzene-azo)-1-amino-7-hydroxy-naphthalene. | 4-(4'-nitro-2'-methoxy-benzene-azo)-1-amino-7-hydroxy-naphthalene. | Dark brown. |
| 27 | 8-(2'-methoxy-benzene-azo)-1-amino-7-hydroxy-naphthalene. | 4-ethoxy-3-chlor-aceto-acet-anilide. | Yellowish brown. |
| 28 | 8-(benzene-azo)-1-amino-7-hydroxy-naphthalene. | Diaceto-acet-tolidine-sulfone. | Do. |

The above examples illustrate only a few of the many new ice colors obtainable from the new azo-arylamines described.

A very large number of coupling components which are devoid of solubilizing groups, namely sulfonic acid and carboxyl may be used. Most suitable are the arylamides of o-hydroxy-aryl-carboxylic-acids and the arylamides beta-keto-carboxylic-acids. Among these are mentioned the arylamides of 2-hydroxy-3-naphthoic-acid, of 2-hydroxy-anthracene-3-carboxylic-acid, of 2-hydroxy-carbazole-3-carboxylic-acid, of 7-hydroxy-alpha-naphtho-carbazole-6-carboxylic-acid, of 2-hydroxy-diphenylene-oxide-3-carboxylic-acid, aceto-acetic-acid, of benzoyl-acetic-acid, and of terephthaloyl-bis-acetic-acid.

The foregoing examples illustrate only a few of the many azo-arylamine compounds which are obtainable and can be used for the ice color bases to produce the compounds of the invention. The aryl nuclei of these diazotizable compounds are free from water solubilizing groups, namely carboxyl and sulfonic acid groups. The group, Aryl as indicated in the general formula of the diazotizable aryl amine compound may be the radical of a benzene, naphthalene, carbazole, anthracene, diphenyl or azo-benzene nucleus which is free from a solubilizing group and it may be unsubstituted or substituted by an n-auxochrome, such as alkyl, alkoxy, aryloxy, aralkyl, aralkoxy, aryl, hydro-aryloxy, acylamino, halogen, nitro and even others, except carboxy and sulfonic acid. In general from 1 to 3 substituents in Aryl are preferred, but more can be used.

Among suitable amines other than those illustrated in the above examples which can be used to make the diazo base the following are mentioned:

Ortho-toluidine
Meta-toluidine
Ortho-anisidine
Para-anisidine
Para-phenetidine
Ortho-xylidine
Para-xylidine
2:5-dimethoxy aniline
2:5-diethoxy aniline
Ortho-chloro-aniline
p-Nitro-aniline
4-nitro-2-amino-anisole
4-chloro-2-amino-anisole
3-amino-benzo-trifluoride
Ortho-phenetidine
4-benzoyl-amino-2:5-diethoxy-aniline
Alpha-naphthylamine
1-amino-2-methoxy-naphthalene
Amino-azo-benzene
Benzidine
4:4'-diamino-diphenylamine
4:4'-diamino-diphenyl-ether
4:4'-diamino-azo-benzene All the amino-naphthols may be utilized generally as second components in the preparation of the azo dye base. These amino-naphthols include 1:5-, 1:6-, 1:7-, 1:8-, 2:5-, 2:6-, 2:7- and 2:8-amino-naphthols.

The general methods of preparing the azo dye base as well as numerous variations in the details of these methods are understood in the art. However, the coupling of the diazotized arylamines or tetrazotized arylene-diamines must be carried out under alkaline conditions in order to obtain products consisting chiefly of the compounds in which coupling has taken place in the nucleus of the amino-naphthol bearing the hydroxyl substituent.

When the azo dye bases contain compounds which result from coupling to the nucleus of the amino-naphthol bearing the amino substituent, the products may be purified to free them from these impurities by various methods. The most convenient method consists in stirring the crude products with a strong mineral acid under proper conditions of acidity, volume and temperature, the principles of which are generally understood by the art. The desired products are caused to dissolve in the acid while the by-products are insoluble. The solutions are filtered and the purified products recovered from the filtrate by precipitation with alkali, filtration, washing and drying. Alternatively the products may be purified by crystallization from a suitable organic solvent.

By the use of the described azo-arylamines as diazo components, a range of ice colors of good fastness properties are produced, the shades usually being browns or blacks.

The colors of desirable shades and fastness are produced on cotton, regenerated cellulose and similar related fibres by any of the procedures for producing ice colors and a large variety of shades can be produced by variations which are well known in the art. The components of the dyes and the dyeings are economical to produce.

The colors may be applied by any of the processes for the application of ice colors. These are well known in the art but they find their most important use in printing according to which alkaline compositions containing the stabilized diazo component and the coupling components is printed on the fibre and developed by hydrolysis of the diazo imino compound.

The following methods of imparting the colors to the fibres are mentioned.

1. The fibres are padded with the arylamide and then immersed in a solution of diazotized aryl amine.

2. The fibres are impregnated with the arylamide and printed with pastes containing the diazotized aryl amine.

3. The diazotized aryl amine is converted to its antidiazotate (nitrosamine) and the fibres are printed with pastes containing the anti-diazotate and the arylamide. The color is then developed by treatment with a mild acid, desirably at an elevated temperature.

4. The diazotized aryl amine is reacted with one of various aliphatic, isocyclic or heterocyclic amines which desirably contains a water solubilizing group and a diazo imino derivative is formed. The fibre to be dyed is printed with a paste containing the diazo imino derivative and the arylamide. The color is then developed by hydrolyzing the diazo imino compound, such as by acting upon the printed goods with an acid, whereupon the coupling is immediately effected.

Among the desirable stabilizing agents are, methyl glucamine, diethanolamine, sarcosine, ethyl taurine, proline and 4-sulfo-2-amino-benzoic acid. The rate of color development will vary among the different derivates of the stabilizing agents but for a given stabilizing agent, it has been found that the rapidity of development of the diazo imino compounds is rapid.

Since from the foregoing description of the invention it will be apparent to those skilled in the art that many embodiments of the invention may be made without departing from the spirit and scope thereof, it is to be understood that no limitations are intended except those which are specifically recited or are imposed by the prior art.

I claim:

1. A water-insoluble azo dyestuff represented by the formula

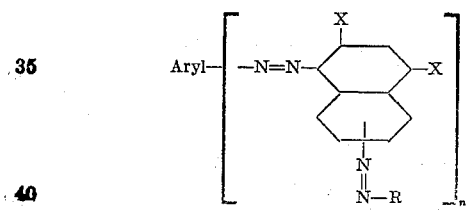

in which Aryl is the radical of a group consisting of compounds of the benzene, the naphthalene, the carbazole, the anthracene, the diphenyl and the azo-benzene series which are devoid of solubilizing groups, one X is hydroxy and the other X is hydrogen, $n$ is an integer not greater than 2, and R is the radical of an ice color coupling component, yielding when produced on the fiber various shades of good fastness properties.

2. A water-insoluble azo dyestuff represented by the formula

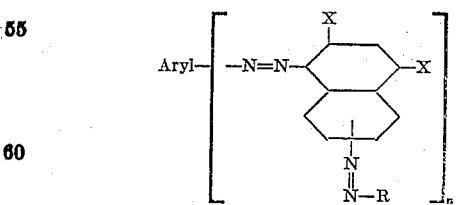

in which Aryl is the radical of a group consisting of compounds of the benzene, the naphthalene, the carbazole, the anthracene, the diphenyl and the azo-benzene series which are devoid of solubilizing groups, one X is hydroxy and the other X is hydrogen, $n$ is an integer not greater than 2, and R is the residue of one of a group consisting of the arylamides of 2-3-hydroxy naphthoic acid which are connected to the azo bridge in the 1-position and the arylamides of beta-keto-carboxylic acids, yielding when produced on the fiber various shades of good fastness properties.

3. A water-insoluble azo dyestuff represented by the formula

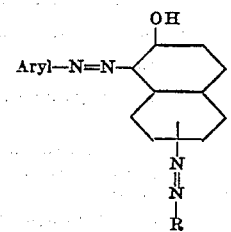

in which Aryl is the radical of a group consisting of compounds of the benzene, the naphthalene, the carbazole, the anthracene, the diphenyl and the azo-benzene series which are devoid of any solubilizing group, and R is the radical of an ice color coupling component, yielding when produced on the fiber various shades of good fastness properties.

4. A water-insoluble azo dyestuff represented by the formula

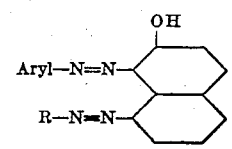

in which Aryl is the radical of a group consisting of compounds of the benzene, the naphthalene, the carbazole, the anthracene, the diphenyl and the azo-benzene series which are devoid of any solubilizing group, and R is the radical of an ice color coupling component, yielding when produced on the fiber various shades of good fastness properties.

5. The compound represented by the formula:

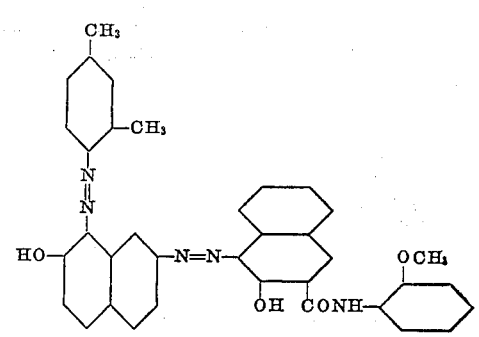

6. The compound represented by the formula:

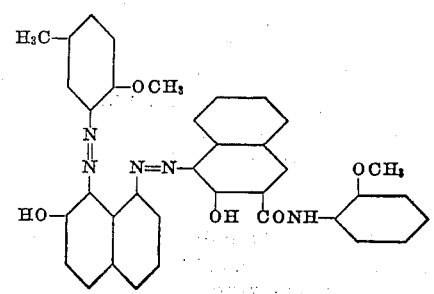

7. The compound represented by the formula:

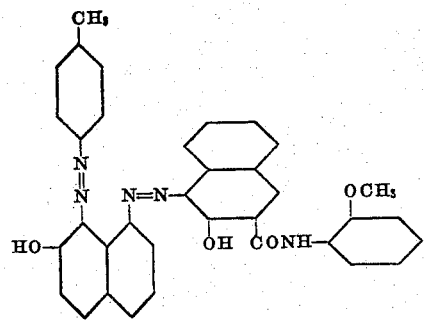

8. Textile fiber dyed with a dyestuff as claimed in claim 1.
9. Textile fiber dyed with a dyestuff as claimed in claim 2.
10. Textile fiber dyed with a dyestuff as claimed in claim 3.
11. Textile fiber dyed with a dyestuff as claimed in claim 4.
12. Textile fiber dyed with a dyestuff as claimed in claim 5.
13. Textile fiber dyed with a dyestuff as claimed in claim 6.
14. Textile fiber dyed with a dyestuff as claimed in claim 7.

FRITHJOF ZWILGMEYER.